G. WHITE.
POWER AND HEAT GENERATOR.
No. 11,619. Reissued July 6, 1897.
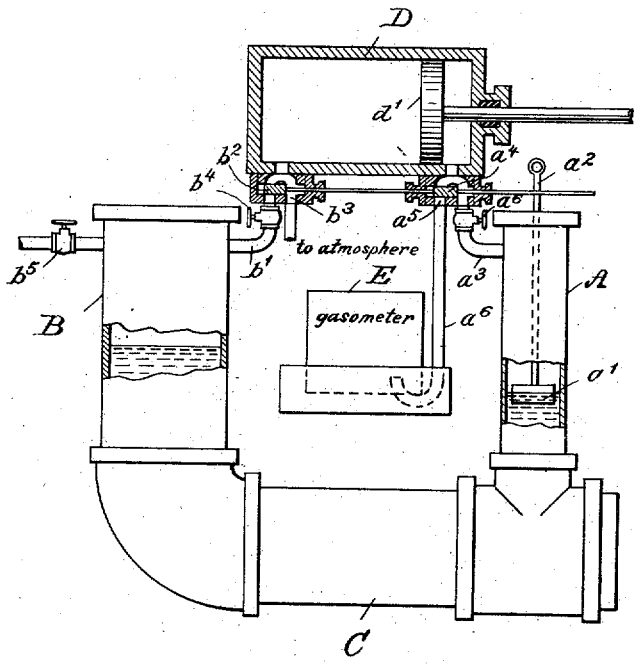
WITNESSES:
J. E. Pearson
Myron L. Zabriskie
INVENTOR
George White
BY
H. H. MacKaye
ATTORNEY
THE NORRIS PETERS CO., WASHINGTON, D. C.

UNITED STATES PATENT OFFICE.

GEORGE WHITE, OF JERSEY CITY, NEW JERSEY, ASSIGNOR TO JAMES R. HATMAKER, OF NEW YORK, N. Y.

POWER AND HEAT GENERATOR.

SPECIFICATION forming part of Reissued Letters Patent No. 11,619, dated July 6, 1897.

Original No. 575,819, dated January 26, 1897. Application for reissue filed April 24, 1897. Serial No. 633,818.

*To all whom it may concern:*

Be it known that I, GEORGE WHITE, a citizen of the United States, and a resident of Jersey City, in the county of Hudson and State of New Jersey, have invented certain new and useful Improvements in Power and Heat Generators, of which the following is a specification.

My invention relates to an apparatus wherein and whereby I am able to utilize the expansive property of gases, such as acetylene gas.

I have devised my apparatus with a view particularly to the utilization of the expansive property of acetylene gas in the generation of power or motive force. In this apparatus I may expand the acetylene gas through an engine directly and recover the same after such expansion into a gasometer to be used for illuminating or kindred purposes, or I may utilize the force to first compress air and then use the compressed air to operate an engine and exhaust the air to the atmosphere.

I have illustrated my invention in the accompanying drawing, which is a vertical elevation of acetylene generating and compressing apparatus, partly broken away, and vertical elevation of gasometer and a vertical section of the engine.

The engine, gasometer, and connecting-valves I have simply shown in diagram, believing that it was unnecessary to illustrate these in detail, as any of the well-known forms of valves and gasometers or, indeed, engines may be used in connection with the apparatus hereinafter described.

I have referred to the several parts by letters, designating like parts by like letters.

A is a reservoir adapted to contain gases.

B is a second reservoir adapted to contain air or equivalent fluid.

C is a water-reservoir with which the reservoirs A and B are connected.

D is intended to represent a reciprocating engine or any other form of engine that may be suitable for the purpose.

E is a gasometer of any form suitable for the purpose.

$a'$ is a basket suspended within the reservoir A and by the rod $a^2$, by which it may be elevated or lowered within said reservoir.

$a^3$ is a tubular connection between the reservoir A and the cylinder D, controlled by the valve $a^4$.

$b'$ is a tubular connection between the reservoir B and the cylinder D, controlled by the valve $b^2$.

$b^3$ is an exhaust-port to the atmosphere, and $a^5$ is an exhaust-port connected by the pipe $a^6$ with the gasometer E. The valves $a^4$ $b^2$ are preferably slide-valves, operating in the usual manner to supply to and exhaust from the engine and controlled by the operative parts of the engine according to well-known principles of engine construction.

It is known that when calcium carbid or equivalent substances are brought in contact with water a gas is generated having great expansive properties. As heretofore stated, it is the purpose of my present invention to provide a device by which the expansive property of said gases may be utilized either directly or through an operation by which air is condensed, and such condensed air is utilized as a motive power. The manner in which I proceed may be described as follows:

For the purposes of the following description I will assume that there are two valves $a^6$ and $b^4$, interposed in the pipes $a^3$ and $b'$, leading from the reservoirs to the engine, and that these valves are closed. This being understood, I first fill the water-reservoir C with water or other suitable liquid having a specific gravity greater than that of gas or air. I then fill the reservoir B with air through a port controlled by a valve, such as $b^5$, and then close said valve. I then fill the basket $a'$ with calcium carbid or a similar compound, and by the rod $a^2$ I lower the said calcium carbid into the water which is in the lower part of the reservoir A. As soon as the calcium carbid comes in contact with the water, as heretofore stated, a gas will be generated known as "acetylene" gas, which has a powerful expansive property. This gas will be confined within the reservoir A and its pressure will be exerted against the column of water in the lower part of the reservoir A and force the water contained in the reservoirs A and C into B and against the column of air within the reservoir B, thus condensing the air within said reservoir to a degree of density or pressure substantially equal to the density or pressure of the gas within the reservoir A. I therefore have two reservoirs containing gas and air under a high degree of pressure. I may utilize this pressure in any of the ways well known for the utilization of such pressure.

For the purpose of showing a use to which I may apply it I have illustrated in diagrammatic form a reciprocating engine D. I may now open the valves $a^6$ and $b^4$ and permit the pressure of the gas and air to be controlled by the slide-valves $a^4$ and $b^2$, respectively. In this event, in the well-understood action of these valves in connection with the operative parts of a reciprocating engine, air and gas will be introduced into the cylinder alternately to affect the piston $d'$. The air will be exhausted to the atmosphere through the valve $b^3$, and I may exhaust the gas to the atmosphere through the valve $a^5$, or I may lead the same from the engine into the gasometer E, from whence I may exhaust the same for illuminating purposes or kindred uses.

It will of course be understood that I may utilize the compressed air alone with the engine or in any other way, or I may utilize the gas under pressure directly in the engine, or I may use both in a manner such as I have described, and I may exhaust the gas directly to the gasometer without expanding the same through the engine.

I have described a water-balance between the reservoirs A and B. It will be readily understood that I may interpose between these reservoirs a mechanical balance, such as a cylinder and piston; but I prefer the water or other liquid having a greater specific gravity than gas or air, as I consider the same better adapted for the purpose.

It will be understood that as the gas is exhausted from the reservoir A a new contact between the calcium carbid and the water will generate a new supply of acetylene gas, which action may be repeated again and again, as heretofore indicated.

What I claim is—

1. A pressure and power generator, consisting of a reservoir adapted to contain gas, in combination with a reservoir adapted to contain air, a connection between such reservoirs, with a hydraulic or equivalent balance interposed therein, means to bring calcium carbid and water into contact within one of said reservoirs, and means to introduce air in the other of said reservoirs, and by the expansive property of the gas to condense the air, in the other of said reservoirs, substantially as described.

2. A pressure and power generator, consisting of a reservoir adapted to contain gas, in combination with a reservoir adapted to contain air, a connection between such reservoirs, with a hydraulic or equivalent balance interposed therein, means to bring calcium carbid and water into contact within one of said reservoirs, and means to introduce air in the other of said reservoirs, and by the expansive property of the gas to condense the air, and means to expand the air thus condensed through an engine to operate the same from one side, and means to expand such gas thus generated through said engine from the other side, substantially as described.

3. A pressure and power generator, consisting of a reservoir adapted to contain gas, in combination with a reservoir adapted to contain air, a connection between such reservoirs, with a hydraulic or equivalent balance interposed therein, means to bring calcium carbid and water into contact within one of said reservoirs, and means to introduce air into the other of said reservoirs and by the expansive property of the gas to condense air, and means to expand the air thus condensed through an engine, to operate the same from one side, and means to expand said gas thus generated through said engine from the other side, and to exhaust said gas from the engine into a gasometer, substantially as described.

4. A pressure and power generator, consisting of a reservoir adapted to contain gas, in combination with a reservoir adapted to contain air, a tubular connection between such reservoirs, with a hydraulic or equivalent balance interposed therein, means to bring calcium carbid and water into contact within one of said reservoirs, and means to introduce air in the other of said reservoirs, and by the expansive property of the gas to condense the air, in the other of said reservoirs, substantially as described.

5. A pressure and power generator, consisting of a reservoir adapted to contain gas, in combination with a reservoir adapted to contain air, a tubular connection between such reservoirs, with a hydraulic or equivalent balance interposed therein, means to bring calcium carbid and water into contact within one of said reservoirs, and means to introduce air in the other of said reservoirs, and by the expansive property of the gas to condense the air, and means to expand the air thus condensed through an engine to operate the same from one side, and means to expand such gas thus generated through said engine from the other side, substantially as described.

6. A pressure and power generator, consisting of a reservoir adapted to contain gas, in combination with a reservoir adapted to contain air, a tubular connection between such reservoirs, with a hydraulic or equivalent balance interposed therein, means to bring calcium carbid and water into contact within one of said reservoirs, and means to introduce air into the other of said reservoirs and by the expansive property of the gas to condense air, and means to expand the air thus condensed through an engine, to operate the same from one side, and means to expand said gas thus generated through said engine from the other side, and to exhaust said gas from the engine into a gasometer, substantially as described.

7. A pressure and power generator, consisting of a reservoir adapted to contain gas, in combination with a reservoir adapted to contain air, a balancing connection between such reservoirs, means to bring calcium carbid and water into contact within one of said reservoirs, and means to introduce air in the other of said reservoirs, and by the expansive property of the gas to condense the air in the other of said reservoirs, substantially as described.

In testimony whereof I have hereto signed my name this 22d day of April, 1897.

GEORGE WHITE.

Witnesses:
CHARLES J. ROE,
HAROLD S. MACKAYE.